J. T. F. CONTI.
WEIGHING MACHINE.
APPLICATION FILED AUG. 7, 1906.

950,528.

Patented Mar. 1, 1910.
4 SHEETS—SHEET 1.

J. T. F. CONTI.
WEIGHING MACHINE.
APPLICATION FILED AUG. 7, 1906.
950,528.
Patented Mar. 1, 1910.
4 SHEETS—SHEET 2.
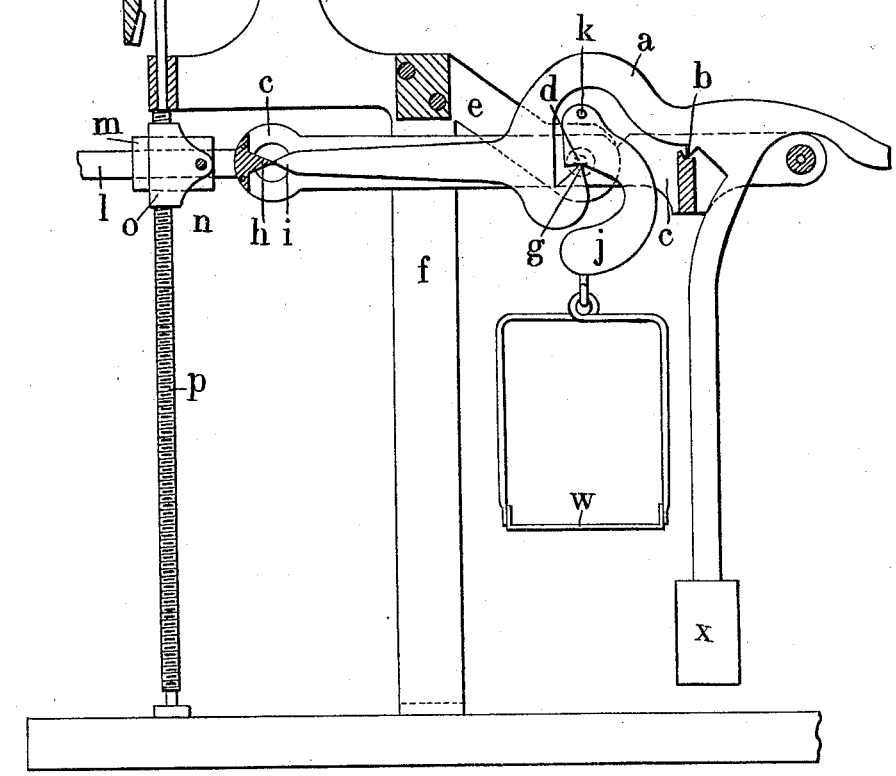

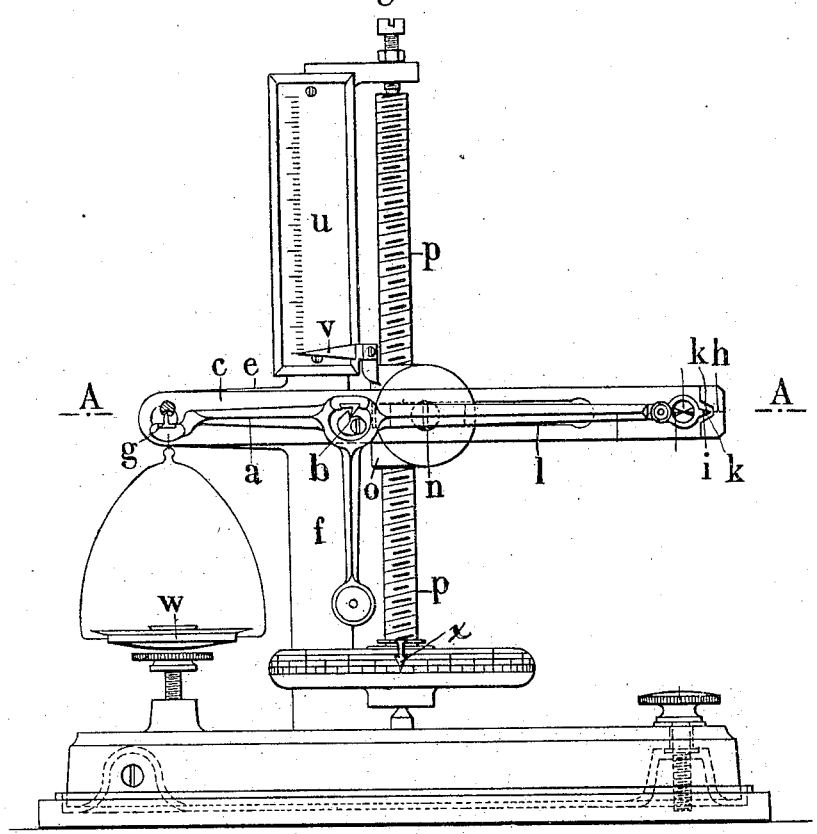
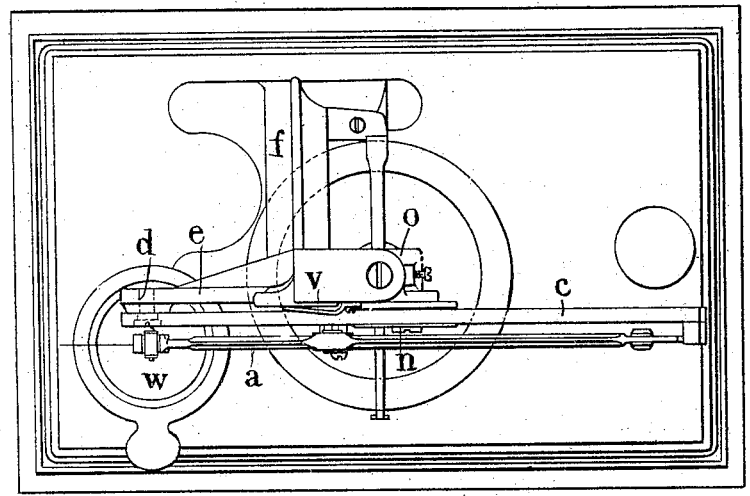

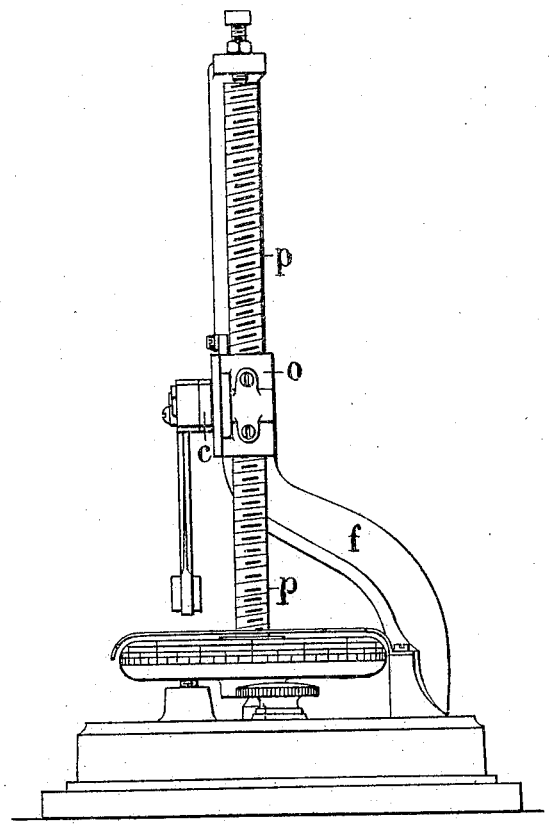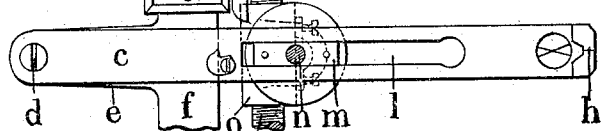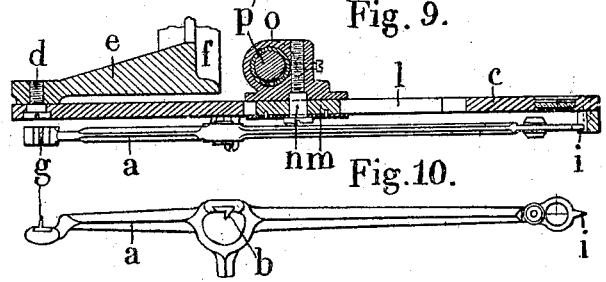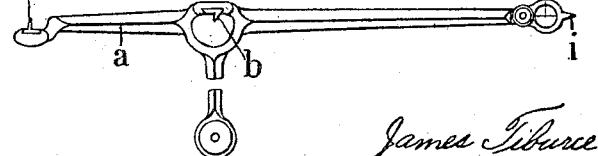

UNITED STATES PATENT OFFICE.

JAMES TIBURCE FELIX CONTI, OF PARIS, FRANCE.

WEIGHING-MACHINE.

950,528.　　　　Specification of Letters Patent.　　Patented Mar. 1, 1910.

Application filed August 7, 1906. Serial No. 329,617.

*To all whom it may concern:*

Be it known that I, JAMES TIBURCE FELIX CONTI, of 8 Quai d'Orleans, in the city of Paris, Republic of France, engineer, have invented a Weighing-Machine, of which the following is a full, clear, and exact description.

The present invention relates to a weighing machine of the ordinary steelyard type and characterized by a special mounting of the steelyard, the combination being such that the displacements of the measuring device are directly proportional to the weight of the loads weighed and always equal relatively for equal differences in weight.

This apparatus permits, moreover, of an arrangement wherein the point of suspension of the load has only a very limited displacement.

The annexed drawing shows by way of example the present system of weighing machine.

Figure 1:
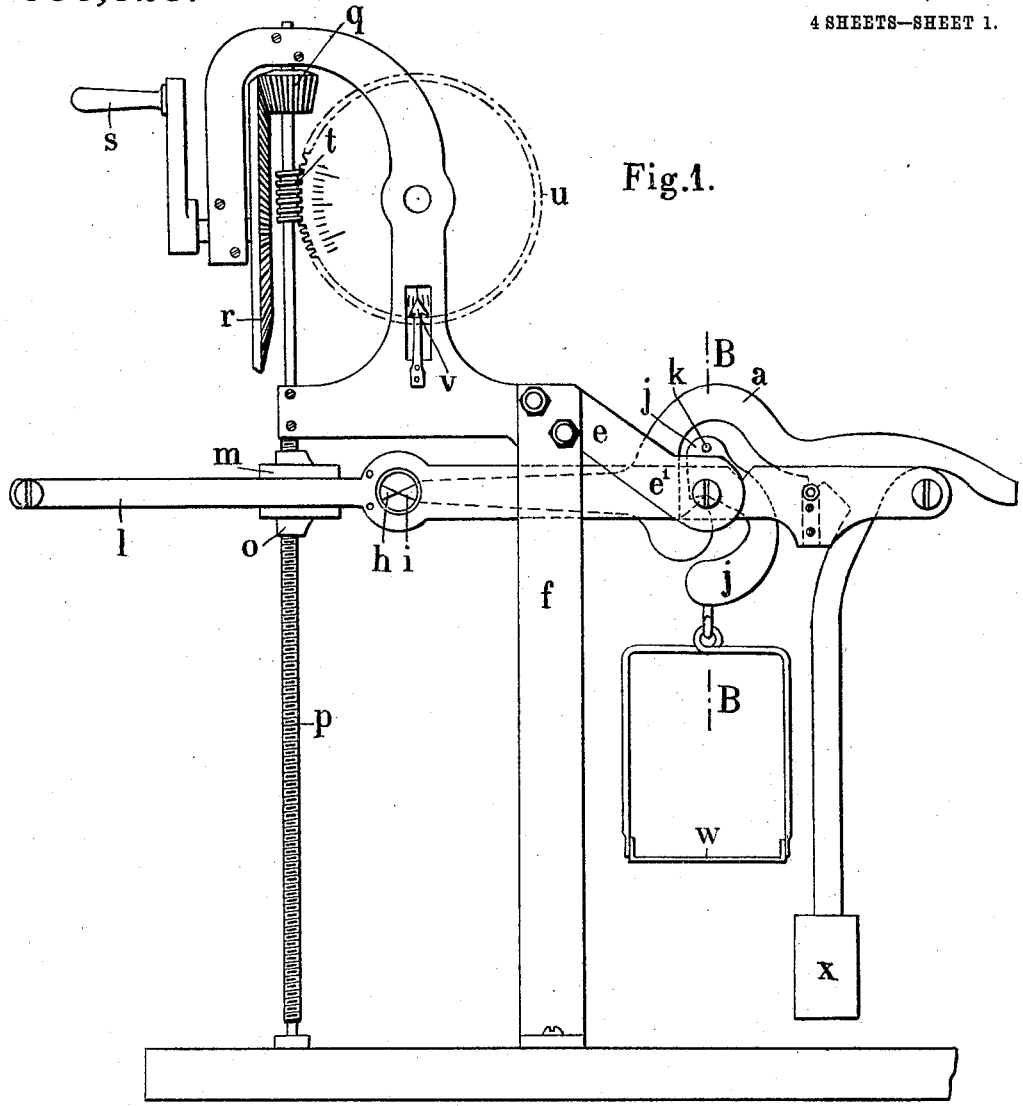
Figure 2:
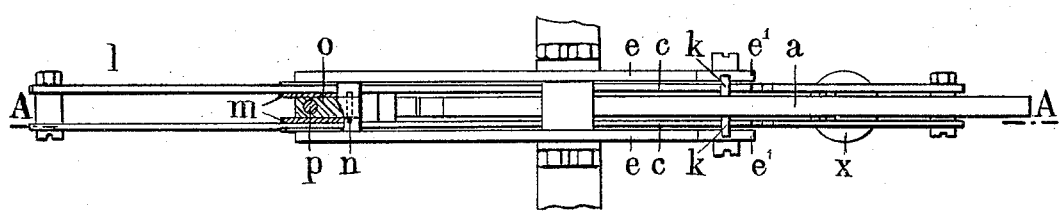

Figure 1 is an elevation. Fig. 2 a plan. Fig. 3 is a section on the line A—A, Fig. 2. Fig. 4 is a transverse section on the line B—B, Fig. 1. Fig. 5 is an elevation of a modification. Fig. 6 is a plan thereof. Fig. 7 is a side view of the same. Fig. 8 is an enlarged view with parts omitted. Fig. 9 is a section on line A—A of Fig. 5 and Fig. 10 is a detail view.

The present weighing apparatus comprises an ordinary steelyard $a$, the oscillating axis $b$ being carried by a lever consisting of two forked cheeks or arms $c$ between which the steelyard is capable of displacement. This lever is movable around a fixed axis $d$ formed by the turned-up ends of two screws mounted on the two cheeks or arms $e$ of a support $f$.

In order to avoid the displacement of the tray during the weighing operation, the point $g$ of suspension of the load is preferably placed in the position of equilibrium as close as possible to the axis of rotation $d$ of the lever $c$ (Figs. 3 and 4).

The position of equilibrium is that in which an index $i$ fixed to a given point of the lever $a$ coincides with an index $h$ on the lever $c$ supporting the steelyard. In the position of equilibrium therefore the axis of rotation of the lever $c$ will be situated very close to the knife edge of the arm of the steelyard to which is suspended the load.

When the steelyard is inclined under the action of the load which is suspended to it, the angle passed through by the arm of the steelyard up to the position of equilibrium is of course equal, therefore it is necessary to displace the lever $c$ in order to reëstablish the agreement of this lever and of the arm of the steelyard. It follows that it is sufficient to measure the angular displacement thus imparted to the lever $c$ in order to ascertain the angle of oscillation of the steelyard $a$, and consequently the weight. As the suspension knife edge of the steelyard $b$ is inclined at the same time as its V-shaped support, the displacement of this knife edge in this support is independent of the angle of oscillation of the steelyard and may be made as slight as desired. This allows of the angular recess in this support being very acute so that the steelyard will never be exposed to slip whatever may be the angle of oscillation.

In order to admit of the instant when equilibrium is obtained being easily ascertained, the indices $h$ and $i$ may be arranged as far as possible from the axis of rotation $d$.

To avoid oscillations of the steelyard at the instant when the load is suspended, the part $j$ which carries the load is provided with two stops $k$ which rest, as soon as the steelyard commences to take an inclined position, upon the bearing surfaces $e'$ afforded by the cheeks or arms $e$ of the support $f$, until such time as the lever $c$ during its angular displacement has sufficiently raised the axis of oscillation $b$ to admit of the index $h$ coming opposite the index $i$. These stops, instead of being carried by the part $j$, might be placed on the arm of the steelyard carrying the head, and in close proximity to the index $i$ so as to allow this index but a very small downward movement relatively to the index $h$ as shown in Figs. 5 and 8.

As has been already mentioned the weight of the load is given by the angle through which the lever $c$ has been displaced in order to bring the index $h$ in accord with the index $i$, and which is equal to the angle of oscillation of the steelyard. To find the weight, by the value of this angle, all the different arrangements employed in the various systems of steelyards might be used, but in order to obtain equidistant divisions on the graduated scale, the tangent of this angle must be measured, for example, by the following arrangement.

The lever $c$ is prolonged through a double slide piece *l* capable of being displaced upon the two guide blocks *m* each movable around an axis *n* on the nut *o* mounted upon the screw-threaded rod *p*, to which a rotary movement can be communicated through the medium of the bevel pinion *q* meshing with a toothed wheel *r* provided with a crank handle *s*.

The lever *c* instead of terminating in a slide piece might consist of two parts slidable the one on the other, so as to permit of its elongation, and in this case the end of this lever might be jointed to the nut *o*.

The screw-threaded rod *p* may besides have at its upper extremity an endless screw *t* meshing with a helically toothed disk *u*, having equidistant divisions marked on its periphery, which disk rotates in front of a fixed index *v*.

In order to estimate the weight of a load the operation is carried out as follows: The apparatus being in equilibrium at zero, which may be verified by noting whether the two indices *h i* are in accord with one another, the load is placed in the tray *w* suspended from the steelyard *a*. Under the action of this load, the steelyard is very slightly inclined until the stops *k* come in contact with the surfaces *e'*, when the crank handle *s* is rotated so as to impart to the screw-threaded rod *p* a rotary movement which has the effect of transmitting a downward vertical movement to the nut *o*, and communicates to the lever *c* an angular displacement around the fixed axis *d*. During this movement, the end of the lever *c* opposite to the nut *o* raises the axis of oscillation *b* of the steelyard up to the time when the counterweight *x* of the steelyard occupies the desired position to equilibrate the load, the rotation of the crank handle *s* is then continued until such time as the index *h* is brought into correspondence with the index *i*, which shows that the equilibrium is established and that an angular displacement has been imparted to the lever *c* exactly equal to the angle described by the arm of the steelyard to attain the position of equilibrium. All that is then required is to read off on the disk *u* the division or graduation that has stopped in relation to the fixed index *v*, and which gives the value of the weight sought.

It will be clearly understood that the disk *u*, instead of being movable, might be fixed and in this case the screw-threaded spindle *p* would be arranged to communicate during its revolution a vertical movement to a movable index or pointer —V— in front of the disk as shown in Fig. 5.

The described arrangement may be applied to weighing machines of all kinds, particularly to weighbridges, and the form, dimensions, as well as the constructive details may be modified in accordance with the various applications. For instance the rod *p* may be so arranged as to operate during its rotation two indices or pointers, for example, one —V— for kilograms, and one —X— for grams or fractions of grams see Fig. 5.

It is understood that the index *i* may be located at any part of the steelyard.

Claims:

1. A weighing machine comprising an ordinary steelyard, a lever movable about a fixed axis and carrying the point of suspension of the steelyard, hand operated means for moving said lever about its axis of rotation, and means for indicating when said lever has moved to the same angle as that occupied by the steelyard due to the action of the load.

2. A weighing machine comprising an ordinary steelyard, a lever movable about a fixed axis and carrying the point of suspension of the steelyard, a means enabling to displace the supporting lever about its axis of rotation and to always bring it again to the same position relatively to the steelyard, a means adapted to measure the tangent of the angle according to which the support is displaced for bringing the steelyard to the initial position relatively to the support.

3. A weighing machine comprising an ordinary steelyard, a lever movable about a fixed point and carrying the point of suspension of this steelyard, an operating screw-threaded rod, a nut movable upon this rod and carrying along the lever in its displacement, a device for measuring the number of revolutions of the rod which is proportional to the weight to be measured.

The foregoing specification of my weighing machine signed by me this 26th day of July 1906.

JAMES TIBURCE FELIX CONTI.

Witnesses:
HANSON C. COXE,
MAURICE H. PIGNET.